United States Patent [19]

Olschewski et al.

[11] Patent Number: 4,653,936
[45] Date of Patent: Mar. 31, 1987

[54] BEARING BUSHING WITH INSERTED SEALING RING

[75] Inventors: Armin Olschewski, Schweinfurt; Bernhard Bauer, Hassfurt; Elisabeth Zirk, Dittelbrunn, all of Fed. Rep. of Germany

[73] Assignee: SKF GmbH, Schweinfurt, Fed. Rep. of Germany

[21] Appl. No.: 795,365

[22] Filed: Nov. 6, 1985

[30] Foreign Application Priority Data

Nov. 9, 1984 [DE] Fed. Rep. of Germany ... 8432792[U]

[51] Int. Cl.⁴ .................... F16C 33/76; F16J 15/32; F16J 15/54
[52] U.S. Cl. .................... 384/484; 277/9.5; 277/11; 384/147; 384/481
[58] Field of Search ............. 384/130, 139, 140, 142, 384/147, 149, 153, 477–489, 584, 559–561; 277/9, 9.5, 10, 11

[56] References Cited

U.S. PATENT DOCUMENTS

| | | | |
|---|---|---|---|
| 3,004,807 | 10/1961 | Kniepkamp | 384/481 |
| 3,384,429 | 5/1968 | Farrell et al. | 384/482 |
| 3,447,848 | 6/1969 | Pitner | 384/484 |
| 3,479,100 | 11/1969 | Pitner | 384/484 |

FOREIGN PATENT DOCUMENTS 2122576 11/1972 Fed. Rep. of Germany ...... 384/153
1139442 1/1969 United Kingdom .

Primary Examiner—Stuart S. Levy
Assistant Examiner—Thomas R. Hannon
Attorney, Agent, or Firm—Rosen, Dainow & Jacobs

[57] ABSTRACT

A bearing bushing is provided with a sealing ring having a conical bore surface on the side remote from the side at which a shaft is inserted. The rim of the bearing bushing is provided with a concial surface which cooperates with the conical surface of the sealing ring during insertion of the shaft so as to restrain the sealing ring in a manner that prevents it from being forced out of the bearing bushing. Alternatively, a restraining ring having a circumferential projection with a conical surface can be arranged to prevent unseating of the sealing ring when the shaft is inserted from the sealing ring side of the bearing bushing. A shaft being inserted exerts axial force on the sealing ring, causing the inner portion of the sealing ring to expand radially as the conical surface of the sealing ring slidingly ascends the conical surface of the bushing rim or restraining ring, thereby allowing easy insertion of the shaft.

7 Claims, 3 Drawing Figures

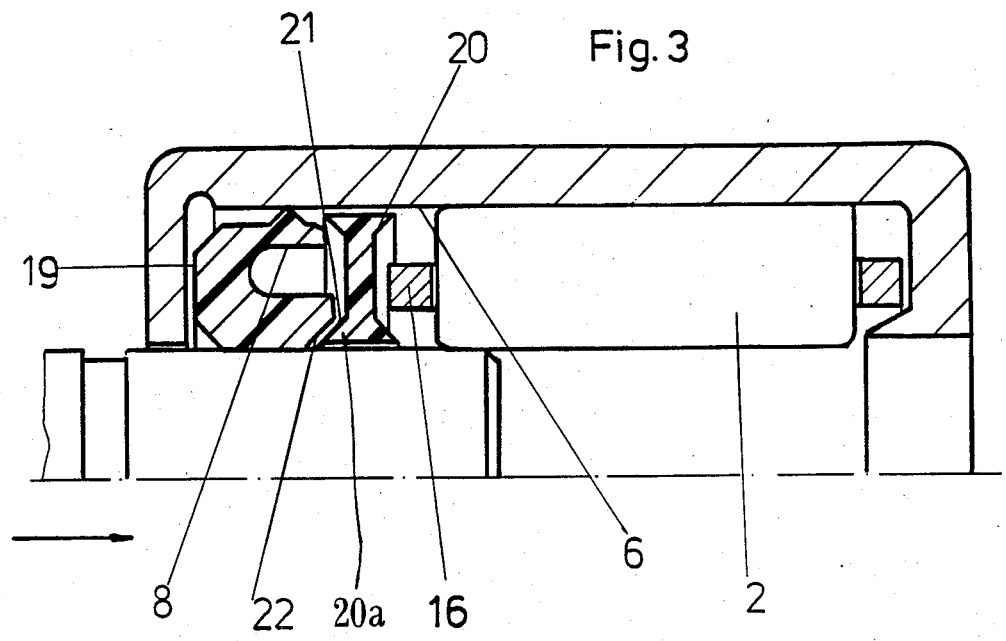

4,653,936

BEARING BUSHING WITH INSERTED SEALING RING

FIELD OF THE INVENTION

The invention relates to a bearing bushing having a sealing ring mounted on the circumferential surface of a shaft or the like, wherein the sealing ring abuts the bore surface and the inner surface of a radially inwardly directed rim of the bushing bearing.

BACKGROUND OF THE INVENTION

Bearing bushings of the aforementioned type are already known and are disclosed, for example, in British Pat. No. 1139442. This known sealing ring has the disadvantage that the sealing ring is easily forced out of the bearing bushing during insertion of a shaft, in particular, a shaft having an annular groove formed on its circumferential surface.

SUMMARY OF THE INVENTION

It is the object of the invention to provide a bearing bushing of the aforementioned type in which the sealing ring can be easily mounted and yet cannot be pushed out of the bearing bushing during insertion of the shaft. The object is attained in accordance with the invention by providing a sealing ring having a conical (i.e. chamfered) bore surface along at least one end of the bore. This conical surface is arranged to cooperate with a conical outer surface of an adjacent restraining element. In this way the portion of the sealing ring which faces the shaft slidably ascends the opposing beveled surface of the restraining element during insertion of the shaft and is thereby radially stretched, so that the sealing ring is braced in the bearing bushing and thereby secured from being forced out. When the shaft has attained its final position, the sealing ring relaxes and abuts the corresponding surface of the shaft.

In accordance with a further feature of the invention, the rim of the bearing bushing is provided with an axially directed annular projection on its inner surface and also the sealing ring is provided with a portion which engages the rim projection during radial expansion of that portion. The play between the bore surface of the projection and the outer circumferential surface of the sealing ring portion adjacent the shaft corresponds to the maximum radial expansion of the sealing ring. In this way an additional restraining means is provided in the area of greatest radial expansion. In order to ensure that the sealing ring will not be pushed out of its seating during insertion of a shaft at the sealing ring side of the bearing bushing, a restraining ring can be arranged in the bore of the bushing between the sealing ring and the rolling elements. The restraining ring is provided with at least one circumferential projection adjacent its bore, which projection is provided with a conical outer surface.

Furthermore, it is advantageous to provide a preferably axially directed annular groove in the sealing ring, which groove extends inwardly from the side surface adjacent the conical, i.e. chamfered, bore surface. This measure renders the sealing ring elastic so that the shaft can be inserted into the bearing bushing more easily.

In addition, it is advantageous to make the width of the support surface, i.e. seat of the sealing ring greater than the width of the annular groove formed in the shaft so that the sealing ring will not be latched in the groove during insertion of the shaft.

BRIEF DESCRIPTION OF THE DRAWINGS

The preferred embodiments of the invention will now be described in detail with reference to the following drawings, wherein:

FIG. 3 shows a further embodiment of the bushing bearing having a restraining ring arranged between the sealing ring and the row of rolling elements.

DETAILED DESCRIPTION OF THE PREFERRED EMBODIMENTS

Figure 1:
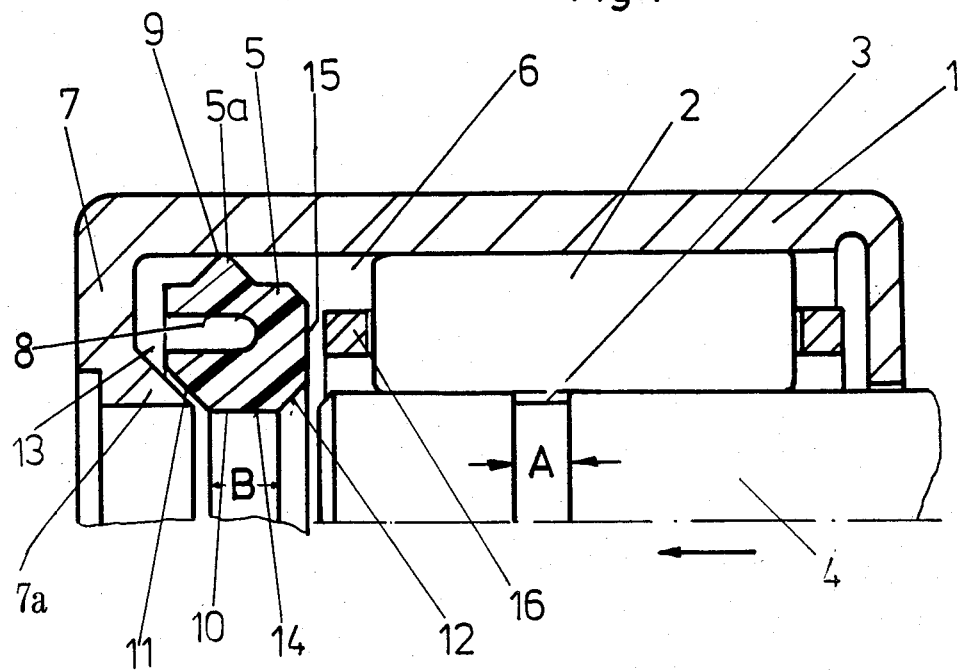
FIG. 1 is a longitudinal section of a preferred embodiment of the bearing bushing in accordance with the invention showing a sealing ring and a partly inserted shaft provided with an annular groove.

In FIG. 1 a bearing bushing 1 with cylindrical rolling elements is depicted, in which a shaft 4 having an annular groove 3 formed therein is inserted in the direction indicated by the arrow (i.e. from right to left). The bearing bushing 1 is sealed by means of a sealing ring 5, the sealing lip 5a of which abuts bore surface 6. The sealing ring 5 also abuts the bearing rim 7. The sealing ring is provided with an axially directed annular groove on the side remote from the rolling elements 2. This groove separates the sealing lip 5a with sealing edge 9 from the portion 10 of the ring 5 which sits on the shaft 4. The bore of portion 10 is provided with conical end surfaces, i.e. chamfers 11 and 12. The chamfer 11 abuts a correspondingly beveled surface 13 of circumferential projection 7a of rim 7. The width A of groove 3 is smaller than the width B of the support (i.e. unchamfered) surface 14 of the sealing ring, so that the latter cannot be latched into the groove 3. As the shaft 4 is inserted in the direction of the arrow, the portion 10 of the sealing ring slidingly ascends along the beveled surface 13. After the shaft is fully inserted, portion 10 creeps back to its original position. This prevents the sealing ring from being pushed out of the bearing bushing 1. The sealing ring 5 is provided with a radial contact surface 15 on the side facing the rolling elements. Contact surface 15 contacts the radially extending sides of cage 16. The cage holds the rolling elements in place in conventional manner.

Figure 2:
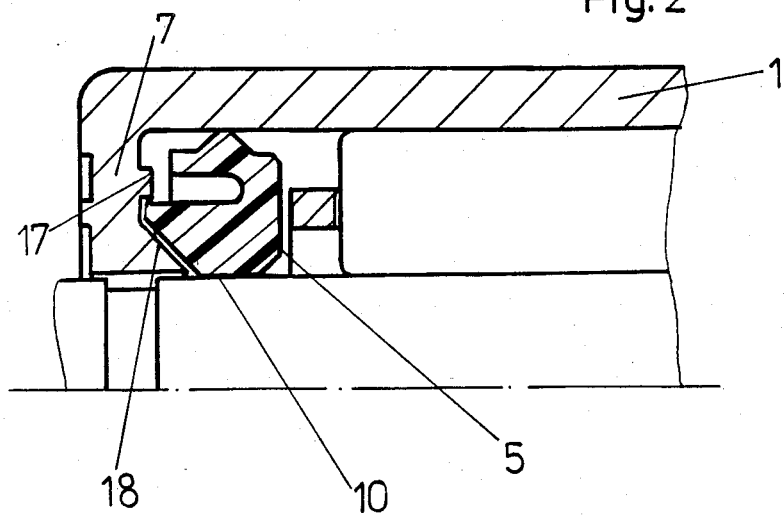
FIG. 2 shows the bearing bushing with the shaft completely inserted and a sealing ring in accordance with FIG. 1, the radial expansion of the sealing ring being restrained by an annular projection on the inner surface of the bearing rim.

The bearing bushing illustrated in FIG. 2 differs from the embodiment depicted in FIG. 1 in that the bushing rim 7 is provided with an axially directed annular projection 17 on its inner surface and the sealing ring 5 is provided with a portion 10 formed to engage projection 17 upon undergoing radial expansion, wherein the play between the bore surface 18 of the projection 17 and the outer circumferential surface of portion 10 corresponds to the maximum deflection, i.e. radial expansion, of the sealing ring.

In accordance with the bearing bushing shown in FIG. 3, a restraining ring 20 is provided between the sealing ring 19 and the cage 16. This restraining ring 20 is provided with at least one circumferential projection 20a having a beveled surface 21 on the side facing the sealing ring 19. The beveled surface 21 cooperates with the chamfered surface 22 of the sealing ring when the shaft 4 is inserted in the direction of the arrow (i.e., from left to right).

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a bearing arrangement including a bearing bushing having a sleeve portion and a radially inwardly directed rim portion, with a sealing ring inserted in the bearing bushing such that said sealing ring abuts a bore surface of said sleeve portion, said sealing ring being adapted to be supported on a circumferential surface of a shaft or the like, the improvement wherein said bearing has a conical restraining surface, said sealing ring having a conical surface at one end of its bore positioned to cooperate with said conical surface of said restraining surface during the application of axial force on said sealing ring in a given direction to radially expand said sealing ring.

2. The bearing arrangement as defined in claim 1, wherein said conical surface of said sealing ring is positioned to be urged in a radially outward direction by said conical surface of said restraining surface as the portion of said sealing ring which carries said conical surface is axially urged toward said restraining surface.

3. The bearing arrangement as defined in claim 1, wherein said conical surface of said sealing ring is arranged at the end of its bore remote from a row of rolling elements and said restraining surface comprises a circumferential projection formed on said inner surface of said rim portion.

4. The bearing arrangement as defined in claim 3, wherein said inner side of said rim portion is further provided with an axially directed annular projection and said sealing ring is further provided with a portion which is arranged to engage said annular projection during radial expansion of the sealing ring bore, the play between the inner surface of said annular projection and the outer surface of said sealing ring portion being substantially equal to the maximum radial expansion of said sealing ring bore.

5. The bearing arrangement as defined in claim 1, wherein said restraining surface comprises a ring arranged between said sealing ring and a row of rolling elements, said restraining ring having a circumferential projection adjacent its bore on which said conical surface of said restraining ring is formed, and said conical surface of said sealing ring being arranged at the end of its bore remote from said rim portion.

6. The bearing arrangement as defined in claim 1, wherein said sealing ring is provided with a substantially axially directed annular groove extending from the side surface adjacent said conical surface.

7. The bearing arrangement as defined in claim 1, wherein said shaft has an annular groove formed therein, the width of the surface of said sealing ring which is supported by said shaft being greater than the width of said annular groove.

* * * * *